United States Patent [19]

Yamada

[11] Patent Number: 4,500,917
[45] Date of Patent: Feb. 19, 1985

[54] METHOD OF FILING SET-UP DATA FOR A PHOTO-ELECTRIC SCANNER AND AN APPARATUS FOR READING SUCH DATA IN THE FORM OF GRAPHS

[75] Inventor: Mitsuhiko Yamada, Kyoto, Japan

[73] Assignee: Dainippon Screen Seizo Kabushiki Kaisha, Kyoto, Japan

[21] Appl. No.: 234,654

[22] Filed: Feb. 17, 1981

[30] Foreign Application Priority Data

Feb. 27, 1980 [JP] Japan .................................. 55-23675

[51] Int. Cl.³ .......................... H04N 1/04; H04N 3/14
[52] U.S. Cl. ........................................ 358/75; 358/78; 358/285
[58] Field of Search ....................... 358/75, 78, 79, 80, 358/285, 288, 293, 294, 296; 318/119, 134

[56] References Cited

U.S. PATENT DOCUMENTS

| | | | |
|---|---|---|---|
| 3,497,610 | 2/1970 | Langberg | 358/285 |
| 4,012,586 | 3/1977 | Roos | 358/285 |
| 4,245,259 | 1/1981 | Pick | 358/285 |
| 4,305,094 | 12/1981 | Yamada | 358/80 |
| 4,319,283 | 3/1982 | Ozawa | 358/286 |
| 4,321,627 | 3/1982 | Hooker | 358/285 |

Primary Examiner—Tommy P. Chin
Attorney, Agent, or Firm—Lackenbach, Siegel, Marzullo, Presta & Aronson

[57] ABSTRACT

Set-up data for a photo-electric scanner are prepared in the form of graphs using an X-Y recorder or the like for the convenience of storage, modification and recognition. Such a method according to this invention is conveniently and accurately carried out through the use of the apparatus according to this invention which can read the graphs using an image sensor and convert them into sets of digital values so as to be accessible from the photo-electric scanner.

9 Claims, 11 Drawing Figures

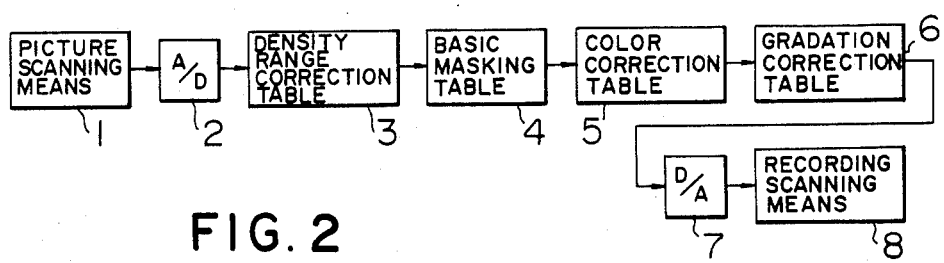
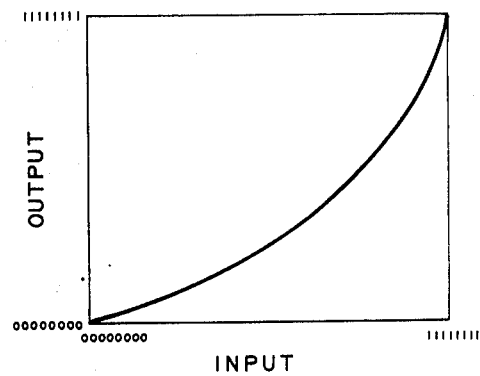
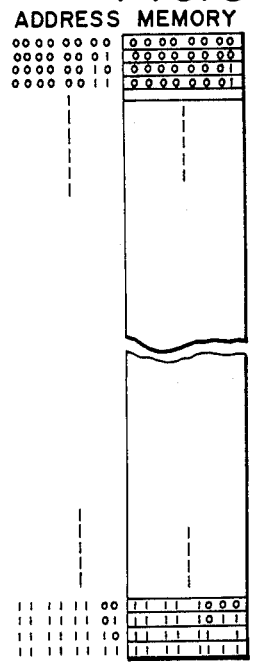
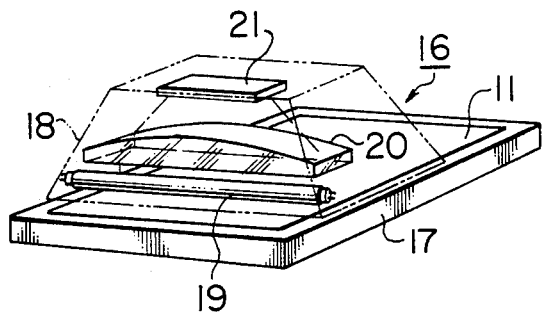
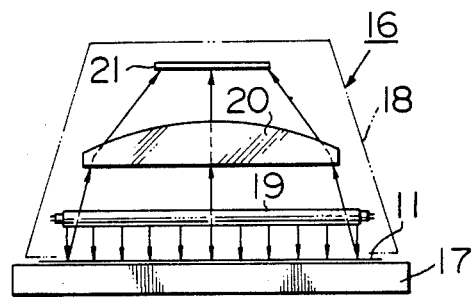

METHOD OF FILING SET-UP DATA FOR A PHOTO-ELECTRIC SCANNER AND AN APPARATUS FOR READING SUCH DATA IN THE FORM OF GRAPHS

BACKGROUND OF THE INVENTION

This invention relates to a method of storing set-up data for a photo-electric scanner in the form of graphs and an apparatus for reading such graphs for use as set-up data.

In operating photo-electric scanners, it is preferable to have desired set-up data in an easily accessible manner so that any particular set of set-up data can be quickly set up on the photo-electric scanners which operate on a real-time basis. To that end, it is necessary to store a wide variation of set-up data in computer memories in the form of tables with proper indices for the convenience of selective retrieval.

Normally, storage of such tables in memory devices are made by controlling the memory devices using a central processing unit (CPU).

In such cases, a table is made from a characteristic curve drawn in a graph which corresponds to the characteristics of color correction, density correction or gradation correction so that the values corresponding to the input are related to the values corresponding to the output, normally by reading the output values with respect to selected input values and writing them into a memory device using a keyboard or other manual means. The input values are used as address signals which designate the data which correspond to the output values. However, such manual processes tend to be time-consuming and inaccurate.

It is possible to use a digitizer or other coordinate reading devices for reading such characteristics conversion graphs and to enter data thus derived directly into a CPU, but the high cost of such devices makes this method impractical for most applications.

As a method of storing a number of conversion tables in an easily accessible manner, it is natured to attach certain index to each set of set-up data or conversion tables. But, since the index itself has no bearing on the characteristics of the particular conversion table, it is not possible to visually inspect the characteristics of the table.

An another alternative, it is possible to store each conversion table in magnetic tape or perforated tape but, as in the previous case, the conversion characteristics recorded in the tape can not be visually compared with another table which was used in connection with another original picture.

Furthermore, if some modification is desired to be made on a conversion table, the information concerning the desired modification must be manually entered on a keyboard or the lime and it requires time-consuming work, often involvihg certain inaccuracy.

SUMMARY OF THE INVENTION

In view of such shortcomings of conventional methods, one of the primary objects of this invention is to provide a method of filing a number of conversion tables which allows a convenient manner of storage in both easily retrievable and modifiable manner. Another object is to provide an apparatus for reading the graphs of conversion characteristics easily and accurately.

According to this invention, such objects are accomplished by providing a method of filing set-up data for a photo-electric scanner, comprising the steps of storing the conversion characteristics for each of the sets of set-up data in the form of a visible graph, converting the graph into a set of input and output values associated with one another using a photo-electric means, and writing the set of input and output values into a memory means which is accessible from the photo-electric scanner when setting up data therefor, and an apparatus for reading conversion graphs for use as set-up data for a photo-electric scanner, comprising a table for mounting a characteristic conversion graph, a carriage slidably mounted over the table in one direction according to input signals, a sensor head, including a light source, a linear image sensor and a lens for focusing the image of the curve of the graph on the cell surface of the linear image sensor, mounted on the carriage in such a manner as to locate the position of the curve along a second direction which is substantially perpendicular to the first direction, and a control means for controlling the relative motion between the table and the carriage along the first direction and for controlling the writing of data obtained by locating the position of the curve into a memory means.

As preferred manners of putting the above-mentioned method into practice, there are the following possible embodiments. But, as a matter of course, they are not meant as the only possible embodiments of this invention but there are other possible embodiments which are obvious to a person skilled in the art according to the description in this specification.

1. The graph is drawn on a sheet of paper using dark ink.
2. Before converting the graph into a set of input and output values, the graph is modified by retracing the curve of the graph on a separate sheet of paper placed over the original sheet of paper.
3. The coordinate axes and secondary marks on the graph are drawn in a color which is distinct from that of the curve of the graph but not distinct from that of the recording medium on which the graph is drawn, to the photo-electric means.
4. When converting the graph into a set of input and output values, the photo-electric means is moved in one direction in steps according to a train of clock pulses which correspond to the input values at the same time as the photo-electric means detects the curve and indicates its position as the output values in association with the specific input values.
5. The set of input and output values converted from the graph are supplied to a memory incorporated in a simulator which simulates the photo-electric scanner of the finish of the color separated reproductions of a specific original picture.

As possible embodiments of the apparatus according to this invention, there are such arrangements as follow:

1. The image sensor is a charge transfer linear image sensor consiting of a plurality of photo-sensitive cells arranged along the second direction, and the light source is also of a linear type.
2. Each of the cells of the linear image sensor is sequentially scanned by the control means for identifying a particular cell which is closest to the image of the curve.
3. The control means associates the position of the curve along the secondary direction with the corresponding position of the carriage along the first direction, the former corresponding to the output data while the latter corresponding to the input data with respect to the partcular conversion characteristics of the graph.

4. The sensor head is further provided with an optical filter which prevents the photo-electric means from confusing the coordinate axes and secondary marks with the curve of the graph.

BRIEF DESCRIPTION OF THE DRAWINGS

In order that the present invention may be better understood, a plurality of methods and apparatuses embodying the present invention will be described in what follows with reference to the accompanying drawings, in which:

FIG. 1 is a flow chart showing the flow of data when carrying out the present invention;

FIG. 2 is an example of a conversion characteristic curve;

FIG. 3 is a memory map of a memory device into which the conversion characteristics of the graph in FIG. 2 are written.

FIG. 4 is a schematic perspective view of an embodiment of the graph scanning means according to this invention;

FIG. 5 is an end view of the graph scanning means of FIG. 4;

DESCRIPTION OF THE PREFERRED EMBODIMENTS

Figure 6:
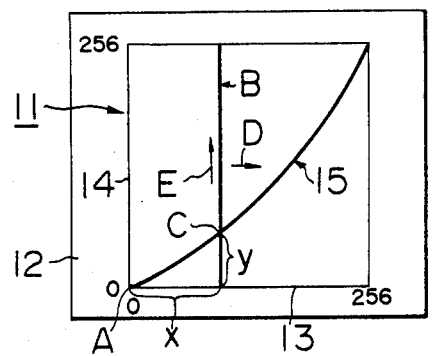
FIG. 6 illustrates how the graph of FIG. 2 drawn on a recording medium is read by the graph scanning means of FIGS. 4 and 5.

Now, in FIG. 1 showing the flow of data, a picture scanning means 1 converts an original picture into color-separated picture signals by photo-electrically scanning the original picture in a known manner. The color separated picture signals are then supplied, through three separate channels for the three basic colors of red (R), blue (B) and green (G), to an A/D (analog-digital) converter 2 so as to be coverted into corresponding digital color picture signals for each of the three separate channel of (R), (B) and (G).

Subsequently, the color separated digital picture signals are processed for each of the color channels, according to a density range correction table 3, a basic masking table 4, a color correction table 5 and a gradation correction table 6, each of which is stored in an appropriate memory means. Usually, the above mentioned procedures are carried out in photo-electric scanner but the present invention can be carried out no matter whether the procedures are all carried out in a photo-electric scanner in a physical sense or in a separate device which is designed to exchange information with a photo-electric scanner.

The color separated digital picture signals of each of the color channels are appropriately converted into picture signals for recording in a form which is directly related to the colors of ink at appropriate stages, for instance at the conversion characteristic tables 3 to 6.

The gradation correction table 6 selectively produces picture signals for recording, in a direct association with ink colors, and send the signals to a D/A (digital-analog) converter 7. The output of the D/A converter 7 is in turn supplied to a recording scanning means 8 to produce reproduction pictures of appropriate ink colors as color separation plates.

Some of the tables 3 to 6 in the above-mentioned processes are common to all original pictures while others are replaced for each of the original pictures depending on the color tone and density range of the original pictures and the desired finish of final prints.

For instance, it is preferable to replace the density range correction table 3, the color correction table 5 and the gradation correction table 6 for each of the original pictures which are photo-electrically scanned by the original picture scanning means 1, and each of the tables 3, 5 and 6 are desired to be stored in an easily erasable memory, such as a random access memory (RAM) which can be written in and read out at will. On the other hand, the basic masking table 4 can be used commonly to all the original pictures and, therefore, should be stored in a RAM or in a read only memory (ROM) depending on circumstances.

The present invention is particularly suitable for filing tables, such as the density range correction table 3, the color correction table 5 and the gradation correction table 6, which are frequently replaced or modified depending on desired finishes and the quality of original pictures.

Now, the present invention is explained in what follows taking an example in a characteristic curve which is to be used as the gradation correction table 6.

FIG. 2 is a graph showing an example of gradation characteristics given as 8-bit data which are stored in a memory device, each assigned with a unique address, and the addresses are plotted along the horizontal axis while the data themselves are plotted along the vertical axis, both as 8-bit binary codes. When considered in view of FIG. 1, the data correspond to the output of the gradation correction table 6 while the addresses correspond to the input of the gradation correction table 6.

FIG. 3 shows a memory map of the characeristics of the graph in FIG. 2 and the memory map or its content is directly associated with the graph.

Now, it is important to note that, if either one of the graph or the memory content is available, it is possible to produce the other since they are equivalent in substance and it is possible to convert one into the other in any desired accuracy. FIGS. 4 to 9 show various arrangements for carrying out such conversions.

Referring FIGS. 4 and 5, a graph 11 is made by drawing a curve such as the one shown in FIG. 2 on a sheet of graph paper, transparency or photographic film on which a coordinate system is defined so that one coordinate axis corresponds to the input data or the addresses of the memory device while the other coordinate axis corresponds to the output data or the data stored in the memory device.

A graph reading means, which is generally designated by numeral 16, comprises a table 17 for mounting the graph 11 in close contact, and a sensor head 18 which includes a linear light source 19, a lens 20 and a linear image sensor 21. The sensor head 18 can be moved only in one of the directions of the coordinate axes in close proximity over the graph 12 mounted on the table 17. And, the linear light source 19 and the linear image sensor 21 are aligned substantially perpendicularly to the direction of the motion of the sensor head 18 or substantially along the other coordinate axis.

The linear light source 19 is preferred to be capable of emitting steady intensity of light, for example, using an elongated incandescent lamp supplied with direct current or an elongated fluorescent lamp driven either by direct current or alternating current of sufficiently high frequency.

Meanwhile, the linear image sensor 21 can be made of an array of photo-diodes or other semiconductor photoelectric transducers but it is preferable to use a charge transfer device (CTD), such as a bucket brigade device (BBD) or a charge coupled device (CCD), which is particularly suited to such applications.

The graph reading means 16 as a whole is designed such that, for instance, the motion of the sensor head 18 relative to the table 17 corresponds to the addresses of the memory device or the input data while the linear image sensor 21 detects the graph curve as a dark spot along the length of the cell surface of the linear image sensor and sends out signals corresponding to the position of the dark spot.

The lens 20 focuses the image of the graph or the dark spot onto the cell surface of the linear image sensor 21 and covers the whole area which the curve may be located. Obviously, some registering means is required for positioning the graph on the table 17 every time at the same position but, since such register can be accomplished by any of conventional methods, it is not specifically shown in the drawings.

Since the coordinate axes themselves are not required for carrying out the present invention other than serving as a reference when visually inspecting such graphs, it is preferable to draw the coordinate axes in a color which is relatively insensitive to the linear image sensor 21. And, the curve in a graph is preferred to be drawn in a color to which the linear image sensor is relatively insensitive or using dark India ink.

When such measures are not sufficient for assuring correct reading of graphs by the linear image sensor, it is possible to use a filter which enhances the sensitivity of the linear image sensor to the curve relative to the coordinate axes and other secondary marks.

In FIG. 6 which is given for illustrating the manner of operation of the graph reading means 16 in reading the graph 11 which is mounted on the table 12, the coordinate axes are indicated by numerals 13 and 14 respectively, while the origin is defined as the intersection of the coordinate axes 13 and 14 and is indicated by (A).

The scanning line of the linear image sensor 21 is indicated by (B) and is actually encompassed by the total length of the linear image sensor 21. The scanning line (B) moves in parallel from the left end of the graph to the right end of the graph and its displacement from the origin (A) or the vertical coordinate axis 14 is given by x. As the scanning line (B) moves to the right in the drawing, the linear image sensor 21 locates the position of the curve 15 as the intersections of the graph 15 and the scanning line (B) with respect to the value x which represents the horizontal coordinate and associates the horizontal coordinates or the values of x with the value of the vertical coordinate y. The arrows (D) and (E) indicate the normal directions of motion of the scanning line (B) and the position of intersection (C), respectively. As will be explained later, the scanning line (B) is controlled so as to complete the scanning of the characteristic curve 15 in steps, for example in 256 steps using 8-bit binary for the horizontal coordinates.

Figure 7:
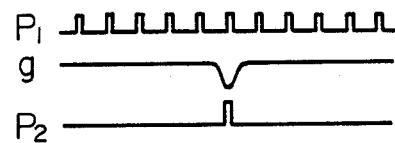
FIG. 7 is a timing chart for showing the relation between the data and the clock pulses of the linear image sensor when reading a graph.
Figure 8:
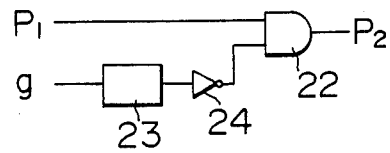
FIG. 8 is a circuit diagram showing an example of the circuit for obtaining the wave form shown in FIG. 7.

FIG. 7 shows a time-chart of the signals which control the above-mentioned graph reading processes while FIG. 8 shows an example of electronic circuit for producing such a relation between the signals. Clock pulses $P_1$ which can be obtained from the internal clock of a CPU which is used for controlling the overall processes is supplied to one of the inputs of an AND gate 22 and the output of the image sensor 21, which is designated as g, is supplied to the other input of the AND gate after passing through a wave forming circuit 23 for level matching and an inverter 24.

The electronic circuit of FIG. 8 thus carries out a logical multiplication on the clock pulses ($P_1$) and the output from the image sensor 21, indicated as g, and produces the intersection pulses ($P_2$).

Figure 9:
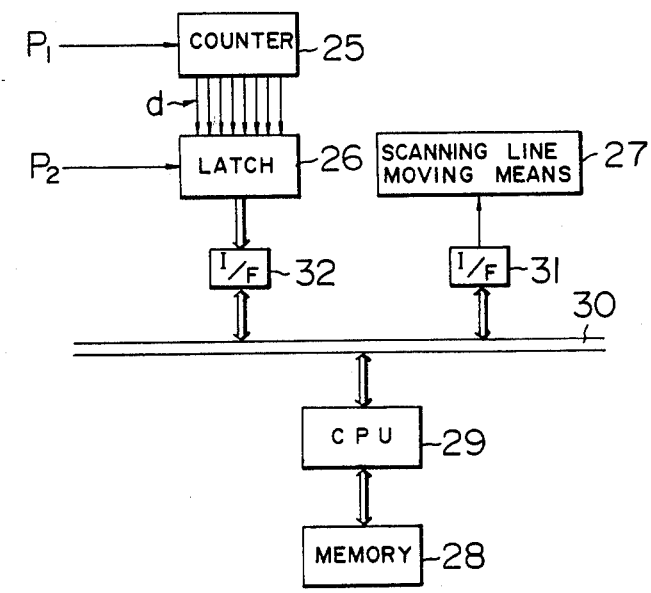
FIG. 9 is a block diagram of a graph scanning circuit which is controlled by signals as shown in FIG. 7.

As indicated in FIG. 9, each of the intersection pulses (Phd 2) is supplied to a latch circuit 26 provided in the binary output circuit of a binary counter 25 which starts counting up the clock pulses ($P_1$) every time a scanning is started and latches a count y of the binary counter exactly when a intersection pulse (Phd 2) is produced. And, the latched count y corresponds to the value of the data at the intersection (C) of the scanning line (B) and the characteristic curve 15.

In this case, the number of cells in the linear image sensor 21 is 256 and, accordingly, the binary counter 25 clears itself every time it counts 256 clock pulses ($P_1$).

Now, referring to FIG. 9, a scanning line moving means 27 is provided between the table 17 and the sensor head 18 (FIGS. 4 and 5) and is designed to control the relative motion between the table 17 and the sensor head 18, controlled by a CPU which records the content of the conversion table in a memory.

The scanning line moving means 27 is connected to the CPU 29 through a bus line 30 and an interface 31 and, whenever the CPU 29 specifies an address of the memory 28, controls the motion of the scanning line (B) so that the scanning line is removed from the origin by a distance which is directly related to the particular address.

Normally, the CPU 29 can be a CPU which is incorporated in a photo-electric scanner but it is also possible to use a separate micro computer as the CPU 29 depending on the circumstances.

At any rate, since the latch circuit 26 is connected to the bus line 30 through an interface 32, every time the CPU 29 designates an address as mentioned before, its output y is written into the designated address of the memory 28 upon arrival of a pulse (Phd 2).

The operational sequence of the CPU 29 when reading a graph can be summarized as follows:

1. The CPU 29 designates a writing address of the memory 28.
2. The scanning line moving means 27 receives the address signal and moves the scanning line (B) to the designated position.
3. The linear image sensor 21 starts scanning a graph as its cells sequentially receive the clock pulses ($P_1$).
4. When an intersection pulse (Phd 2) is produced, the output y of the latch circuit 26 is received by the CPU 29.
5. The data y received by the CPU is written into the address of the memory 28 which the CPU has designated in step 1.

6. The CPU designates a next address of the memory 28. When the 256th address is designated, the writing of the memory 28 is terminated. Otherwise, step 1 is repeated again.

As described above, the graph 11 is read out and a conversion table having characteristics identical to those of the characteristic curve 15 defined on the graph 11 is recorded in the memory 28.

The apparatus according to this invention thus comprises a graph reading means 16 and an electronic cirucit which controls the graph reading means 16. Since the CPU 29 which makes up the essential part of the circuit can be shared with a photo-electric scanner, the apparatus for entering set-up data can be manufactured at a very low cost, compared with similar conventional input devices, and can produce conversion tables having desired characteristics in the memory 28, which may also be incorporated in the photo-electric scanner, very easily in a very short time.

And, according to this invention, since conversion tables are filed or stored on a sheet of paper or the like as graphs, graphs having the same characeristics as those of the conversion tables can be produced in a very simple manner using any conventional method.

In what follows, preferable manners of producing graphs 11' from the content of the memory 28 is described.

Figure 10:
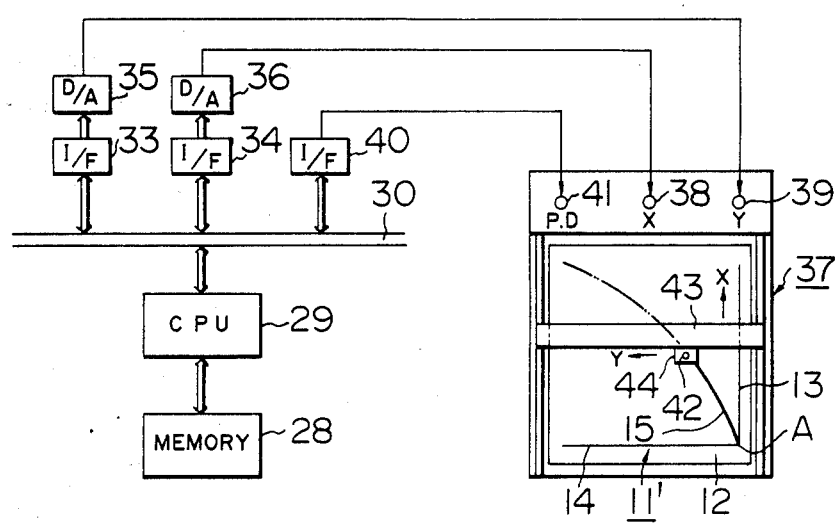
FIG. 10 is a block diagram pertaining to the production of graphs for filing from conversion tables stored in a memory device.

Now, referring FIG. 10, when producing the graph 11', it is necessary to connect D/A converters 33 and 34 to the bus line 30 through interfaces 33 and 34 and then connect each of the analog output signals from the D/A converters to the X and Y input terminals 38 and 39 of an X-Y recorder 37. In addition, the bus line 30 is connected to the pen-down terminal 41 of the X-Y recorder 37 through an interface 40.

With the CPU 29 and the memory 28 connected to the bus line 30 as before, the addresses of the memory 28 are sequentially addressed by the CPU 29 starting from the first address and ending at the last address of the corresponding data and are consecutively produced from the designated adresses on the bus line 30. At the same time, the address signals are sent to the X input terminal 38 of the X-Y recorder 37 while the pen-down signals from the CPU 29 corresponding to the data at the designated addresses are sent to the pen-down terminal 41 at appropriate times.

A graph recording medium 12 identical to the one used for the graph 11 is mounted on the X-Y recorder 37 and the origin (A) of the coordinate axes 13 and 14 defined on the recording medium 12 (or at X=0 and Y=0) is set as the starting point of a pen 42 of the X-Y recorder 37.

Then, the pen 42 fixed on a Y carriage 44 which is mounted slidably in the Y-direction on an X-carriage 43 is moved in both the X- and the Y-directions as the X-carriage 43 is driven in the X-direction by the address signals while the Y-carriage 44 is driven in the Y-direction by the data signals in synchronism with the address signals, whereby a graph 11' is reproduced on the recording medium 12.

The graphs thus prepared can be conveniently filed for later uses, using a material which is inexpensive and occupies extremely little space. Furthermore, a user can readily check the content of the conversion characterisitcs recorded in the form of graphs and, if it is desired to modify a conversion graph thus prepared in conjunction with a certain original picture, the user may retrace the filed graph on a recording medium such as tranparency while making necessary modifications on the retraced graph. And, when using the graph thus retraced in setting up a photo-electric scanner, the apparatus according to this invention can be used for reading the retraced graph and supplying the data thus obtained to a memory device for storing set-up data.

It is also possible to use an X-Y plotter instead of the X-Y recorder in a similar manner for reproducing a graph such as the graph 11'. When hard copies are not required, an oscilloscope or a CRT monitor may be used for visually inspecting the content of the table stored in a memory.

Figure 11:
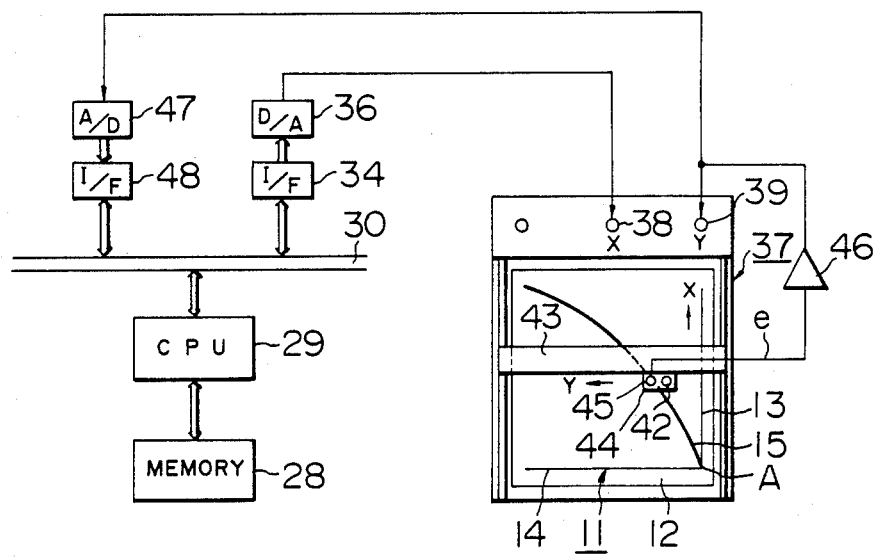
FIG. 11 is a block diagram showing another manner of reading graphs.

FIG. 11 shows another possible arrangement for reading graphs using an X-Y recorder 37 on which a line detecting head 45 is mounted in a similar manner as mounting the pen 42. The line detecting head 45 is mounted on the Y-carriage 44 next to the pen 42 and is controlled to trace the center of the curve 15 as the X-carriage moves in the X-direction.

To accomplish such a function, the line detecting head 45 is designed to produce a deviation signal e corresponding to the deviation of its position from the curve 15 in either the +Y or −Y direction. By supplying the deviation signal e to the Y-input terminal 39 of the X-Y recorder 37 via an amplifier 46, an automatic position control is made on the Y-carriage 44 so that the line detecting head 45 always remains on the characteristic curve 15.

In short, as the X-carriage travels in the X-direction, the Y-carriage moves accordingly so that the line detecting head 45 follows along the characteristic curve 15.

Accordingly, as the CPU 29 moves the X-carriage 43 in steps by advancing the addresses from the first address which corresponds to the origin (A) on the graph 11, the deviation signal e supplied to the Y-input terminal of the X-Y recorder 37 is received by the CPU 29 through an A/D converter 47 and an interface 48 and the obtained data is written into the memory 28 every time the CPU 29 designates an address.

By filing various conversion characteristic tables for setting up data on a photo-electric scanner, it becomes easier to make comparison of characteristics of one conversion table to another, in addition to the above-mentioned advantages.

Furthermore, since the conversion table thus filed in the form of graphs can be easily transferred to another sheet of paper or to a memory device using a copying machine or a graph reading machine such as the apparatus according to this invention. By doing so, not only the repeated use of a conversion characteristic table becomes possible but also the possibility of any inaccuracy either through human errors or errors inherent to the equipment involved can be eliminated. In other words, it means a higher level of reproducibility.

Filing such data in the form of visible graphs has many obvious and unobvious advantages. For one thing, the possibility of human errors, such as taking one set of data for another can be avoided, and, for another thing, it becomes easier to associate one set of data with certain original pictures. For instance, each of the graphs may be conveniently filed with the particular original picture for which the graph was used for setting up data on a photo-electric scanner.

Normally, when setting up data for a photo-electric scanner in connection with a certain original picture, graphs selected for several categories of data conversion are prepared in advance and written into a memory which may be copied on the photo-electric scanner in an arbitrary manner. However, it is also possible to use other intermediate memory means in the process of copying the graph on the memory for the photo-electric scanner. In this conjunction, it is preferable to use a simulator for data set-up as the one disclosed in the specification of the U.S. patent application Ser. No. 102,106, dated Dec. 10, 1979. now U.S. Pat. No. 4,305,094, which is also assigned to the same assignee as for the present application.

We claim:

1. A method of filing set-up data for a photo-electric scanner incorporating a central processing unit having a memory comprising the steps of:

drawing a graph on a sheet of paper on which a coordinate system is defined so that one coordinate X axis corresponds to input data of a memory device while the other coordinate Y axis corresponds to output data stored in said memory device;

mounting said graph on a table having coordinate X and Y axes with the origin of said graph defined as the intersection of said coordinate X and Y axes;

scanning said graph on said table with a linear image sensor having a scanning line that encompasses and is parallel to the Y axis and moves from said origin of the graph along the length of the X axis, the position of said graph being designated at the intersection of said scanning line with respect to the values of X and associates the values of Y as being the intersection of the values of X with said scanning line, said linear image sensor being capable of transmitting X and Y output signals associated with said X and Y axes;

controlling the relative motion between the table and the linear image sensor by way of the central processing unit so that the scanning line is moved from said origin in steps by distances which are directly related to particular X values; and recording in the memory of said central processing unit the Y output signals sent by the linear image sensor at each of the steps in a digital form with the associated X designations of the central processing unit so that a conversion table having characteristics of said graph is recorded in the memory of said control processing unit.

2. A method according to claim 1, wherein said memory device is incorporated in a simulator which simulates a photo-electrical scanner of the finish of color separated reproductions of a specific original picture.

3. A method according to claim 1, wherein said graph is filed with an original picture from which the graph input and output data was derived.

4. An apparatus for reading conversion graphs for use a set-up data for a photo-electric scanner, comprising:

a table for mounting a characteristics conversion graph, said table having coordinate X and Y axes with respect to the origin of the graph defined as the intersection of the coordinate X and Y axes;

a carriage mounted over said table slidably movable in the X direction according to input signals;

a sensor head, including a light source, a linear image sensor having photo-electric means, and a lens for focusing the image of the graph on said linear image sensor, mounted on said carriage movable in such a manner so as to locate a curve or any point position by movement of said linear image sensor over said graph from a position aligned with said origin and parallel to the Y axis in the X direction; and a control means supplying said input signals for controlling the motion of said carriage relative to said table along the X axis from said origin.

5. An apparatus according to claim 4, wherein said linear image sensor is a charge transfer linear image sensor and said light source is a linear-type light source.

6. An apparatus according to claim 5, wherein said control means associates the position of the graph along the Y axis with the corresponding position of said carriage along the X axis, with the Y axis corresponding to Y output values and the X axis corresponding to X input values with respect to the characteristics of said graph.

7. An apparatus according to claim 5, wherein said linear image sensor is a photo-electric transducer.

8. An apparatus according to claim 6, wherein said Y values of graph are tracked as said linear image sensor is moved along said X axis by detecting the deviation of the position of said linear image sensor from the position of said graph.

9. A method according to claim 6, wherein said central processing unit has an internal clock, and said linear image sensor is moved in one direction in steps according to a train of clock pulses which corresponds to the X input values at the same time as said linear image sensor detects said graph and indicates its position as the Y output values in association with said input values.

* * * * *